United States Patent

[11] 3,572,960

| [72] | Inventor | James W. McBride |
| | | Cincinnati, Ohio |
| [21] | Appl. No. | 788,358 |
| [22] | Filed | Jan. 2, 1969 |
| [45] | Patented | Mar. 30, 1971 |
| [73] | Assignee | General Electric Company |

[54] REDUCTION OF SOUND IN GAS TURBINE ENGINES
3 Claims, 5 Drawing Figs.

[52] U.S. Cl. .................................................. 415/115, 415/119, 415/193
[51] Int. Cl. .................................................. F01d 5/14, F01d 5/16, F04d 29/66
[50] Field of Search ........................................ 230/122 (BL), 232, 233, (Inquired); 415/115, 116, 119, 168; 415/191—195, 216

[56] References Cited
UNITED STATES PATENTS
2,489,683  11/1949  Stalker .................. 230/122BL
2,944,729  7/1960  Foley et al. ............ 415/115
3,237,850  3/1966  Troller .................. 415/115
3,420,502  1/1969  Howald .................. 415/115

FOREIGN PATENTS
111,822  8/1964  Czechoslovakia ........ 230/122BL
225,231  4/1943  Switzerland ............ 415/115

*Primary Examiner*—William L. Freeh
*Assistant Examiner*—John J. Vrablik
*Attorneys*—Derek P. Lawrence, Lee H. Sachs, Frank L. Neuhauser, Oscar B. Waddell, Thomas J. Bird, Jr. and Joseph B. Forman

ABSTRACT: The disclosure shows a representative axial flow compressor in the form of a fan employed in reaction type propulsive engines. The inlet guide vanes and the rotor blades of this fan are provided with slots lengthwise of the outer portions of their trailing edges. Pressurized air is discharged from these slots to minimize circumferential velocity gradients immediately downstream of the vanes and blades. By minimizing such velocity gradients, sound generated by the air entering the rotating blades and the outlet guide vanes is minimized.

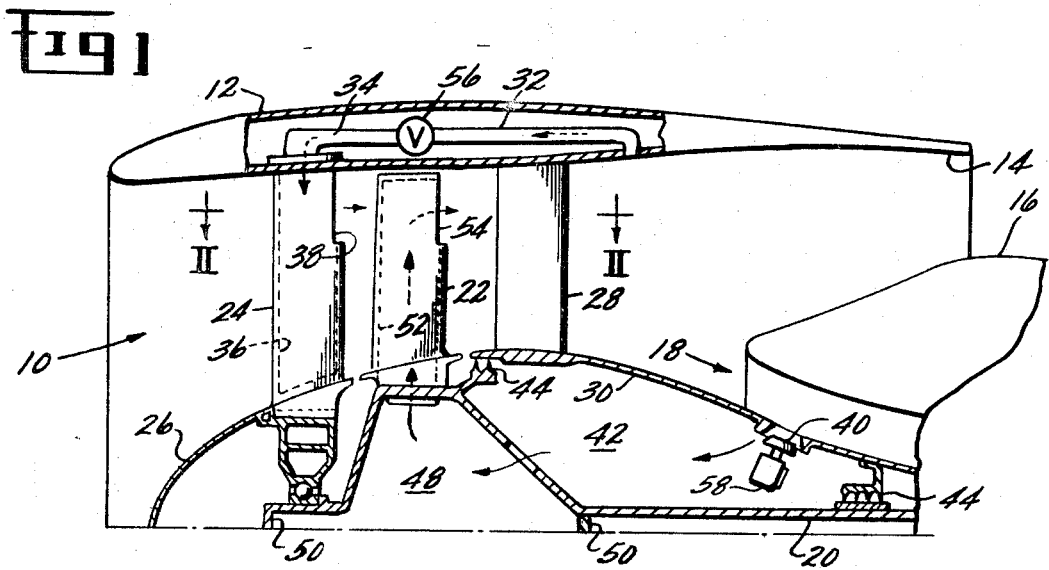
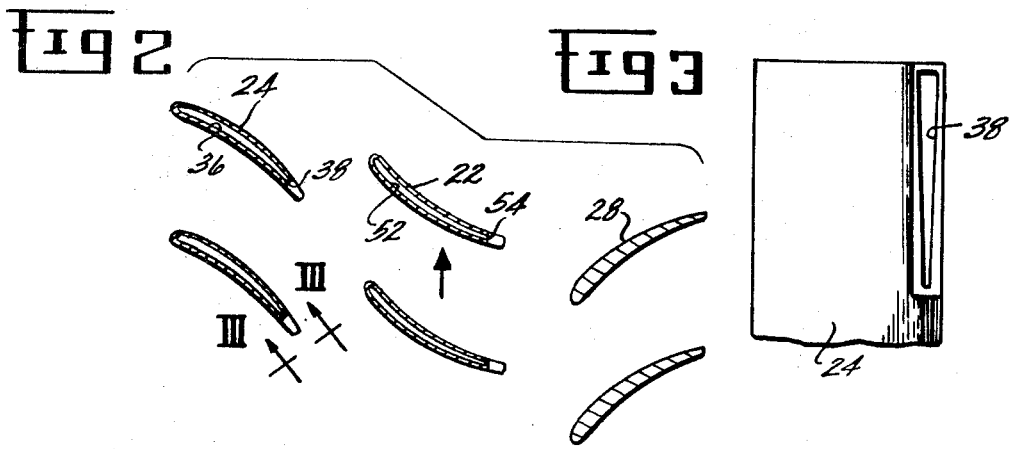
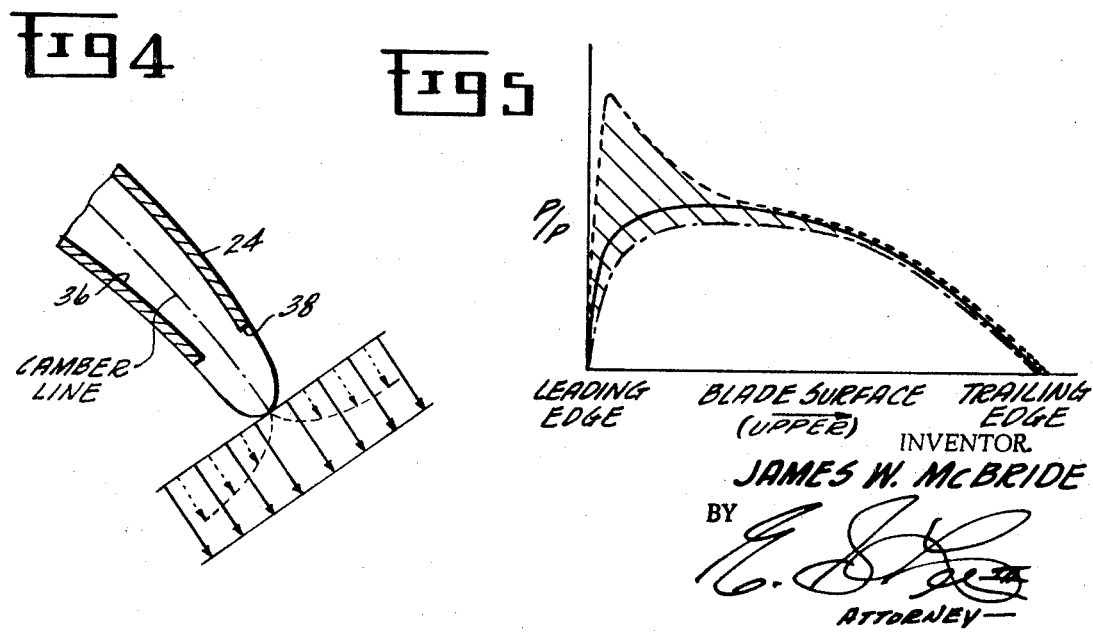
INVENTOR.
JAMES W. McBRIDE
BY
ATTORNEY—

REDUCTION OF SOUND IN GAS TURBINE ENGINES

The present invention relates to improvements in gas turbine engines and, more particularly, to improvements in reducing the sound levels of such engines in operation, particularly in the propulsion of aircraft.

Objectionable noise levels of aircraft operating at low levels over populated areas, particularly adjacent to airports, has become an everincreasing problem. Not only are the number of aircraft in operation increasing at an accelerated rate, but the development of larger aircraft results in noise levels and frequency of noise intrusions which have both sociological and economic consequences on the areas affected by such operation of aircraft.

The great bulk of today's aircraft are propelled by gas turbine engines. These engines are either of the turbojet or turbofan type. Propulsive force is obtained, in whole or in large part, through the discharge of a hot gas stream through a propulsive nozzle.

In turbojet engines propulsion is derived solely by the discharge of a high velocity hot gas stream from a propulsive nozzle. This has created severe noise problems and many different approaches have been proposed to suppress this type of noise. In fact, today most, if not all, commercial aircraft are provided with some type of sound suppression mechanism for their gas turbine powerplants.

A turbofan engine comprises a bladed axial flow compressor, referred to as a fan. A portion of the air pressurized by the fan enters the core engine of the engine to generate the hot gas stream which is used to power the fan rotor and also provides a small amount of the overall propulsive force of the engine. The remainder of the fan stream bypasses the core engine and is discharged, at relatively low velocities, through a propulsive nozzle to provide the greater proportion of the propulsive force generated by the engine.

In the recent past, turbofan engines have been developed in which a much greater proportion of the propulsive force is provided by the bypassed, fan stream. These engines are commonly referred to as high bypass turbofan engines.

Such high bypass turbofan engines have many benefits well recognized by those skilled in the art. These engines, however, introduce a new sound problem. Whereas the hot gas stream discharge had been the primary source of noise generated by earlier engines, the noise generated by the fan of high bypass turbofan engines has become the primary noise source, and, generally speaking, sound suppression techniques developed for the hot gas stream are not applicable to the noise generated by such fans.

While emphasis has been placed on high bypass turbofan engines, it should also be recognized that gas turbine engines having axial flow compressors of relatively large diameters and/or high peripheral tip speeds generate substantial noise which contributes to the overall suppression problems for such engines, albeit that the hot gas stream may be employed as the major or sole source of propulsive energy.

Many proposals have been made to reduce the level of noise generated by such engine fans or compressors. The use of sound suppression liners in the compressor or fan ducts does have a beneficial effect of absorbing sound and minimizing the propagation of wound from the engine. It has also been proposed to eliminate the inlet guide vanes normally employed to properly direct incoming air to the rotating blades of the fan. Further, it has been proposed to space the stationary and rotating rows of fan blades a substantial distance apart, usually two chord lengths or greater. Both of these last two approaches are effective in minimizing the decibal level of sound generated. However, they do not, alone or in combination, fully satisfy the goals for reduced sound levels which have been established for the aircraft industry. Further, the two approaches mentioned impose on the engine performance penalties and/or weight penalties which must be accepted during all modes of operation of the engine.

While it is unlikely that any means will be found to obtain significant reductions in the operational noise levels of gas turbine engines without some performance penalty, either in the form of increased weight and/or increased complexity and cost and/or loss of efficiency, the object of the present invention is to obtain significant reductions in such noise levels with an utmost minimum performance penalty.

More specifically, it is an object of the present invention to reduce the noise levels generated by axial flow compressors and, particularly, low pressure rise, axial flow compressors, known as fans, in turbofan engines.

An was indicated above, noise level reductions have been obtained by greater axial spacing between the stationary and rotating blade rows of a fan. The beneficial result obtained can be explained by the fact that the increased flow distance between the blade rows minimizes the circumferential velocity gradients in the airstream as it enters the downstream row of either stationary or rotating blading. With a minimized velocity gradient in the entering airstream, pressure perturbations, at the leading edges of the downstream blades, are likewise minimized and the sound generated by such perturbations is also minimized.

The present invention provides an improved means for minimizing such velocity gradients, by providing discharge means in the trailing edge portions of the blades of a compressor. Pressurized air is supplied to these discharge means at a sufficient flow rate to substantially eliminate negative wakes or circumferential velocity gradients immediately downstream of the blades. These blade rows are, preferably, closely spaced so as to avoid any weight or efficiency penalties incident to the greater spacing of the blade rows. Further, by providing inlet guide vanes having such discharge means to minimize velocity gradients at their trailing edges, greater fan and compressor efficiencies can be obtained without the noise problem ordinarily associated with the use of inlet guide vanes.

It is further preferred that the discharge means take the form of slots, symmetrically disposed relative to the median camber line of each blade and that the blades be hollow to provide a plenum chamber for the supply of pressurized air thereto.

The above and other related objects and features of the invention will be apparent from a reading of the following description of the disclosure found in the accompanying drawing and the novelty thereof pointed out in the appended claims.

In the drawings:

FIG. 1 is a simplified showing of the fan portion of a gas turbine engine, illustrating the present invention;

FIG. 2 is a section taken on line II–II in FIG. 1, illustrating the sequential cascade of blades in this fan portion of the engine;

FIG. 3 is a view taken on line III–III in FIG. 2;

FIG. 4 illustrates the relative airflow velocity vectors at the trailing edge of a blade; and FIG. 5 is a plot of pressure distribution along the length of an airfoil.

FIG. 1 illustrates the present invention in the environment of a turbofan engine. Such engines comprise a fan section 10, which pressurizes an airstream entering the engine at the entrance to a cowl 12. A portion of this pressurized airstream is discharged through an annular nozzle 14, formed, in part, by the downstream end of the cowl 12 and, in part, by an inner nacelle 16, housing a so-called core engine or gas generator.

The inner portion of the pressurized fan airstream enters a core engine inlet 18. The air entering the core engine is further pressurized to support combustion of fuel in generating a hot gas stream. This hot gas stream, in accordance, with well-known techniques, drives the compressor of the core engine and also drives a fan rotor shaft 20, prior to being discharged from a propulsive nozzle. The combined propulsive forces of the airstream discharged from the nozzle 14 and the hot gas stream discharged from its nozzle are advantageously employed in the propulsion of aircraft.

As indicated above, the core engine powers or drives the fan rotor shaft 20 (FIG. 1). The fan rotor shaft has a circumferential row of airfoil blades 22 projecting therefrom. A circumferential row of inlet guide vanes 24 are disposed upstream of the rotating blades 22 and extend between the cowl 12 and a bullet nose 26, defining the inner bounds of the airstream entrance to the fan. A circumferential row of outlet guide vanes 28 are disposed downstream of the rotating blades 22 and extend from the cowl 12 to an inner casing 30 which defines the inner surface of the core engine inlet 18.

The description of the fan 10 and its environment in a turbofan engine, to this point, covers well-known features, the detailed construction and operation of which are well-known to those skilled in the art.

In accordance with the present invention, pressurized air is ducted from a point downstream of the outlet guide vanes 28, through one or more conduits 32, to the outer ends of the inlet guide vanes 24. Preferably the conduits 32 extend through the structure of the cowl 12 and connect with an annular header 34. The inlet guide vanes 24 are of hollow construction, providing internal cavities 36 which open into the header 34. Slots 38 are formed in the outer trailing edge portions of the guide vanes 36 (see FIG. 3) so that pressurized air may be discharged therefrom.

Air pressurized by the fan is also ducted to the rotating blades 22. Openings 40 are formed in the casing 30 so that pressurized air may be first ducted to a chamber 42 defined by a portion of the rotor shaft 20 and the casing. This chamber is sealed by labyrinth seals 44, effective between the rotor 20 and the casing 30. Openings 46 are formed in the rotor 20 to duct the pressurized air into a chamber 48 interiorly of the forward end of the fan rotor and further defined by plugs 50 which seal spaced portions within the hollow rotor. The fan blades 22 are also of hollow construction, providing internal cavities 52 which open, through the rotor, to the pressurized chamber 48. Slots 54 are formed in the outer portions of the trailing edges of the blades 22, in the same fashion as in the vanes 24, so that pressurized air may be discharged from the cavities 52 in a downstream direction.

As air flows past guide vanes or rotor blades of a compressor, it is divided into separate flow streams. In a plane, taken along the trailing edge of a conventional blade and normal to the median camber line thereof, there is essentially a zero velocity vector (or possibly a negative velocity vector if one considers certain boundary layer characteristics). To either side of this zero velocity vector there is a progressively increasing velocity to the relatively uniform velocity of the flow paths between the blades or vanes. What results is a velocity gradient to either side of the trailing edge of the blade which is commonly referred to as a wake. This is illustrated by the dotted vector plots in FIG. 4.

The described provision of means for discharging pressurized air from the slots 38 or 54 of the vanes 24 and blades 22 eliminates, or substantially minimizes, this velocity defect or wake condition. It will be seen from FIG. 4 that the openings 38 (as well as the openings 54) are aligned with the median camber line of the vane and, further, that the volume and velocity of air discharged provides the velocity vector relationship illustrated by the solid line plot of FIG. 4 in a plane immediately downstream of the vanes 24 (or blades 22).

By eliminating the wake condition, pressure pulses which generate sound may be drastically reduced. This is illustrated in FIG. 5, which is a plot of the pressure rise from the leading to the trailing edge of a blade 22. The solid line plot in FIG. 5 illustrates the type of pressure rise obtained when there is a substantially uniform circumferential velocity gradient in the airstream discharged from the guide vanes 24 to the rotating vanes 22, such a condition being attained through the elimination of wake, as above described.

To put the invention in further perspective, if there were circumferential velocity gradients in the airstream entering the blades 22, the pressure rise would fluctuate from the solid line plot of FIG. 5 to the dashed line plot shown thereon. This results in the generation of pressure pulses having a frequency equal to the blade-passing frequency of the blades 22 relative to the vanes 24. Such frequency is within the audible sound range and at the tip ends of the blades has a high energy level. The described use of bleed air to eliminate wake, or substantially eliminate wake, tends to minimize, if not eliminate, the generation of such pressure pulses and consequent objectionable sound. The above discussion regarding the benefits of eliminating wakes in the air passing from the guide vanes 24 to the rotating blades 22 is also applicable, with the same resultant benefit, to the air passing from the rotating blades 22 to the outlet guide vanes 28.

With elimination of wakes in the manner described, the row of rotating blades 22 is closely spaced with respect to the row of guide vanes 24, preferably within one-tenth to one chord length. Thus, it is possible for the fan or compressor to operate most efficiently with a minimum envelope and weight, while still reducing the levels of sound generated by the fan.

It is well-known that, in an axial flow compressor rotor, static pressure rise and/or velocity increase radially toward the outer bounds of the annular flow path. This factor is taken into account in the preferred embodiment of the invention. Preferably, the openings 38 and 54 are provided only in the outer portions of the vanes 24 and blades 22, as illustrated. The length of these slots is, advantageously, 50 percent of the radial length of the blades. The pressure pulses generated by the wake conditions in the inner portion of the annular airstream are not generally of significant consequence in producing undesirable noise intensities, and it is, therefore, possible to minimize the amount of bleed air used. It will also be noted that the width of the slots 38 ( and 54), as illustrated in FIG. 3, progressively increase towards the outer ends of the vanes. This takes into account the radial velocity gradient mentioned above, not only to utilize a minimum amount of bleed air but, further, to maintain a substantially uniform velocity gradient in all portions of the outer bounds of the annular flow path.

Preferably the described utilization of bleed air is limited to those portions of an engine's operation, in the propulsion of an aircraft, where sound reduction is required. To this end means are provided for shutting off bleed airflow during operation of the engine outside a sound reduction regime. These means are illustrated in FIG. 1 as a valve 56, in the conduit 32, which may be appropriately actuated to shutoff bleed air flow to the inlet guide vanes 24. Similarly, appropriately actuated solenoid valves 58 close the openings 40, to shutoff bleed airflow to the blades 22.

It will be apparent that, in operation outside a sound reduction regime with bleed flow shutoff, there is substantially no performance penalty insofar as the fan is concerned. Further, the weight penalties involved in providing a sound reduction regime of operation are minimal and readily incorporated within existing structure.

While the above description has been directed to the use of the present invention in a turbofan engine, and particularly the fan portion thereof, it is to be remembered that such fans are, generically, axial flow compressors and that the benefits of the present invention may be obtained in all types of axial flow compressors. This and other variations in the described embodiment will occur to those skilled in the art, and the scope of the present inventive concepts is, therefore, to be derived solely from the appended claims.

I claim:

1. An axial flow compressor having a first row of fixed and a second row of rotatable cambered blades, said rows being axially spaced, said blades of said first row having, in their trailing edges, openings generally aligned with the median camber line of said blades, said openings comprising elongated slots extending from the outer ends of said blades inwardly for approximately 10 to 50 percent of the radial length of said blades, said slots tapering from a narrow width to a wider width toward the outer ends of said blades, and means for discharging pressurized air from said slots in a direction and with a velocity sufficient to, at least substantially, eliminate wakes in the trailing edges of said upstream row of blades.

2. A compressor as recited in claim 1 further including a row of stationary outlet guide vanes positioned downstream of said second row of blades, said first row of blades comprising stationary inlet toward the outer end of said blades.

3. In an axial flow compressor including at least two circumferential rows of cambered blades, said rows being axially spaced and one of said rows rotating, the upstream row of blades being provided with trailing edge openings, said openings being adapted to provide for the flow of pressurized air therethrough in a direction, and with a velocity sufficient to, eliminate wakes in the trailing edges of said upstream row of blades, the improvement which comprises:

said trailing edge openings being positioned such that said pressurized air exits therefrom in a direction substantially parallel to the camber line of each of said blades of said upstream row, said trailing edge openings comprising elongated slots extending from the outer ends of said rotating blades inwardly approximately 10 to 50 percent of the radial length of said blades, and said slots being tapered from a narrow width to a wider width guide vanes, the blades of said second row having, in their trailing edges, openings generally aligned with the median camber line of said blades of said second row, said openings in said blades comprising elongated slots disposed at the outer ends of said blades and having a radial length of approximately 10 to 50 percent of the length of said blades, said slots being tapered from a minimum width at their inner ends to a maximum width at their outer ends, and means for discharging pressurized air from the openings of said blades in a direction and with a velocity sufficient to, at least substantially, eliminate wakes in the trailing edges of said blades.